Figure 1:
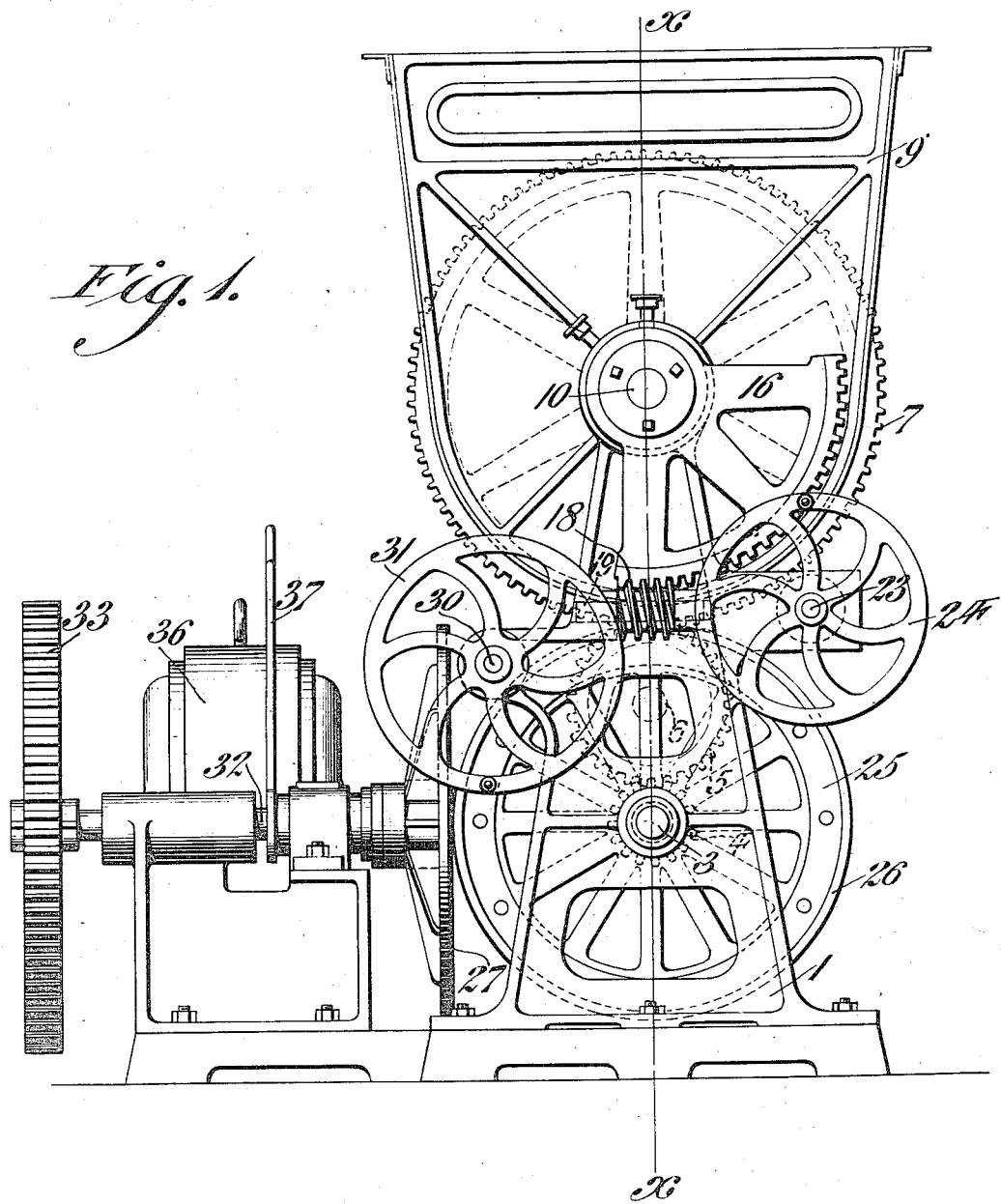

H. GOTTSCHALK.
METHOD OF AND APPARATUS FOR MIXING DOUGH.
APPLICATION FILED APR. 10, 1911.

1,008,639.

Patented Nov. 14, 1911.

3 SHEETS—SHEET 1.

WITNESSES

INVENTOR
Hugo Gottschalk.
BY Wiedersheim & Fairbanks.
ATTORNEYS

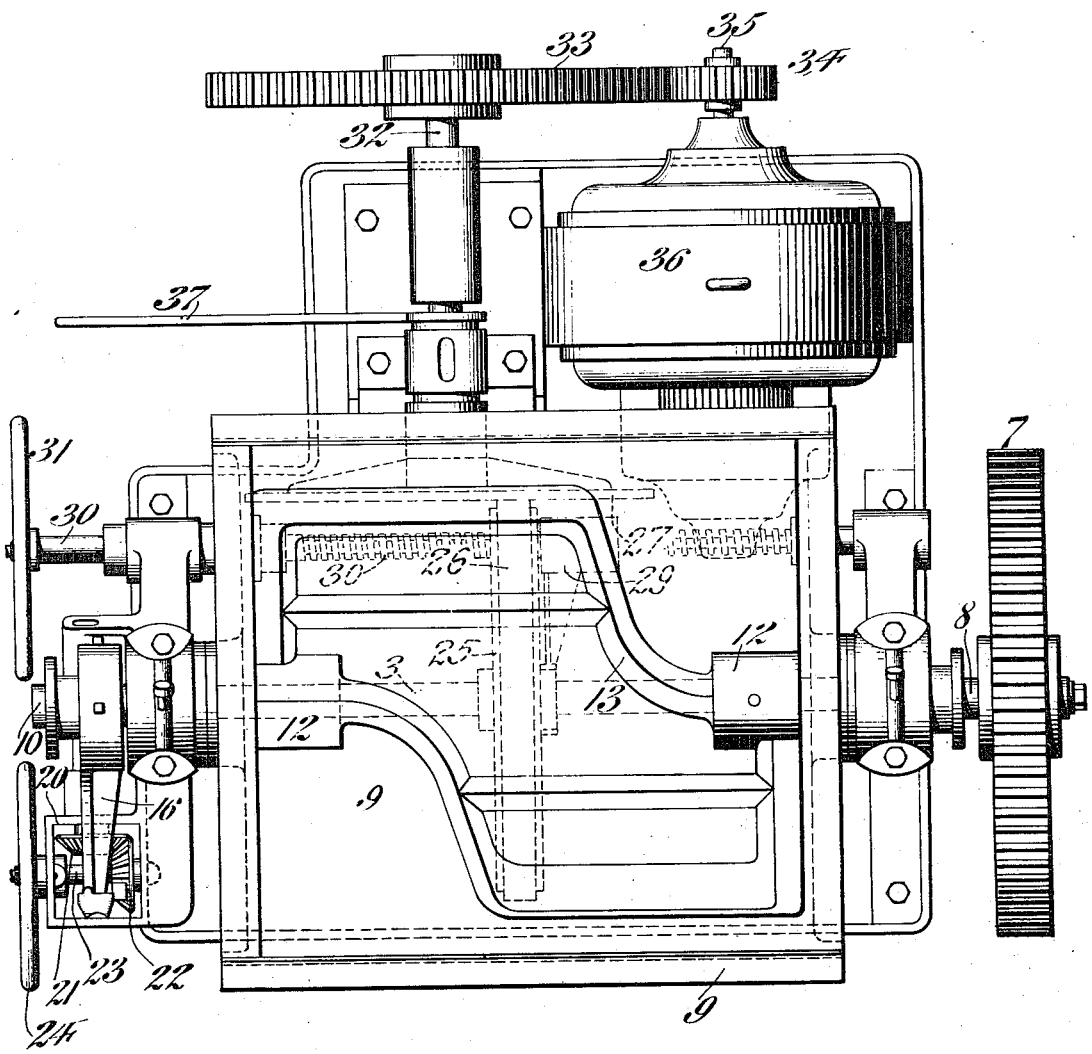

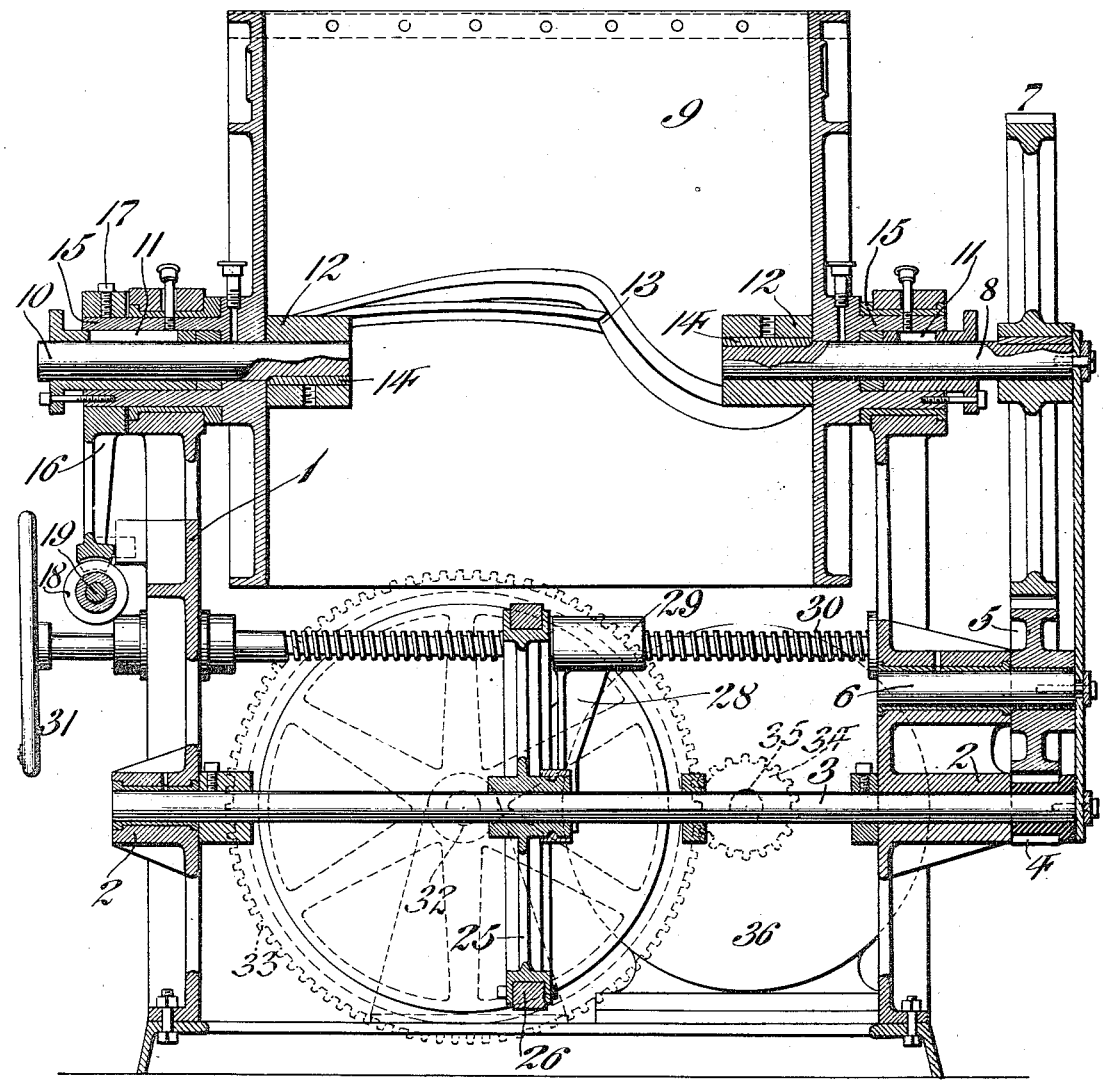

UNITED STATES PATENT OFFICE.

HUGO GOTTSCHALK, OF BURNHAM, PENNSYLVANIA, ASSIGNOR TO GOTTSCHALK & CO.
INC., OF REEDSVILLE, PENNSYLVANIA, A CORPORATION OF DELAWARE.

METHOD OF AND APPARATUS FOR MIXING DOUGH.

1,008,639.   Specification of Letters Patent.   Patented Nov. 14, 1911.

Application filed April 10, 1911. Serial No. 619,998.

*To all whom it may concern:*

Be it known that I, HUGO GOTTSCHALK, a citizen of the United States, residing at Burnham, in the county of Mifflin, State of Pennsylvania, have invented a new and useful Method of and Apparatus for Mixing Dough, of which the following is a specification.

This invention relates to a method of and apparatus for mixing dough and has for an object to provide a dough mixer wherein the material is worked uniformly and evenly while the air and gases are thoroughly worked through the mass of dough producing a dough of high baking value and quality.

It has for a further object to provide a mechanism wherein the dough is acted upon by a mixing device operating at varying speeds, whereby the material has a rising and falling movement within the mixer of very beneficial effect.

It has for a further object to provide a mixing device wherein the mixing blades rotate in one direction at a gradually changing speed until a predetermined point is reached when the direction of rotation is reversed and the speed gradually diminishes thus in one movement the blades rotate from a maximum to a minimum and in the other the movement is from a minimum to a maximum.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a dough mixing machine embodying my invention. Fig. 2 represents a plan of the same. Fig. 3 represents a section on line *x—x*, Fig. 1.

Similar numerals of reference indicate corresponding parts in the figures.

Referring to the drawings:—1 designates the frame of a dough mixing machine embodying my invention, the same being suitably mounted and having bearings 2 formed therein, in which is journaled a shaft 3. This shaft 3 carries a pinion 4 meshing with an intermediate gear 5 mounted on the stud shaft 6 in the frame 1, the said intermediate gear being in mesh with a gear 7 suitably keyed to a stud shaft 8 and upon which one side of the mixing receptacle 9 is journaled. The opposite side of the mixing receptacle 9 is mounted upon a similar shaft 10 suitably journaled in the frame 1 it being noted that both shafts are provided with journal boxes 11, of customary construction. Each of the shafts 8 and 10 in the present instance extend within the receptacle 9, a sufficient distance to receive the hubs 12 of the blade structure 13. These hubs 12 are secured by a spline 14 to the respective shafts whereby the blades 13 rotate with the movement of the shaft 8. It will be noted in the present instance that the hubs 15 of the mixer are of sufficient length to form an effective bearing to distribute the wear over the surfaces while one of the hubs 15 has a gear segment 16 fixedly secured thereto by set screws 17 or like fastening devices, whereby the position of the mixing receptacle 9 may be changed to discharge the dough at intervals, as desired. This gear segment 16 meshes with a worm 18 suitably journaled in the frame 1, the said worm 18 being suitably mounted upon a spindle 19 having a bearing in the bracket 20. This spindle 19 carries a bevel gear 21 adapted to mesh with a similar gear 22 on spindle 23, upon which latter is located a hand wheel 24, by means of which movement is communicated to the worm 18 and thereby causes a tilting action of the receptacle 9.

25 designates a friction wheel slidingly mounted upon the shaft 3 and provided with a circumferential friction surface 26 adapted to engage a friction driving disk 27. The wheel 25 in the present instance has an arm 28 secured thereto carrying an internally threaded sleeve or leader nut 29 mounted upon a feed screw 30, the latter being suitably journaled in the frame 1 and having a hand wheel 31 secured thereto to effect operation of the same. It will thus be apparent that the rotation of the feed screw 30 causes the leader nut 29 to move longitudinally thereof and carry the wheel 25 from one position to another in order that a variation in the speed of the driving gears 5 and 7 may be obtained. This variation in speed as will be apparent, is obtained by moving the wheel 25 from one edge of the driving disk 27 to the other and the result is a speed varying from a maximum to a minimum and reversely. The disk 27 is mounted upon a suitably mounted shaft 32 driven by gears 33 and 34, the latter being connected to the shaft 35 of a motor 36 which, in the present instance, supplies the power. It will be understood that the disk 27 is suitably keyed upon the shaft 32 for sliding movement thereon, which action is controlled by means of a lever 37 serving as a starting and stopping device for the mechanism.

In the operation of the device the dough is placed within the receptacle 9 and the disk 27, through the medium of the lever 37 is brought into engagement with the friction wheel 25. At this time the wheel 25 is preferably in position to start the mechanism revolving at slow speed whereupon the mixing blades 13 work the dough slowly and evenly distributing the air throughout the mass. The hand wheel 31 is now brought into operation to rotate the feed screw 30 and advance the leader nut 29 so that the friction wheel 25 gradually passes across the face of the driving disk 27, thereby preferably increasing the speed of the mixing blades until a maximum is reached at the outer periphery of the disk 27. The direction of movement of the wheel 25 is now reversed and the speed gradually diminishes to a minimum when the center of the disk is reached, and as soon as this center is crossed the blades of course begin to revolve in the opposite direction and the speed is again gradually increased until the edge of the disk is again reached. Thus it will be apparent that by combining a friction wheel drive mechanism with a dough mixer, I am enabled to work the dough more evenly and more effectually than heretofore has been possible, while the constantly changing speed of the blade insures a thorough intermingling of the air and gases. This changing of speed is especially advantageous since it produces a rising and falling of the dough within the receptacle 9 such as has not been heretofore attained and by means of which the air is drawn into the dough and worked therethrough uniformly in a highly desirable manner. Furthermore, the reversing of the blade mechanism during the mixing of the dough causes the same to work in the opposite direction and further break up the air within the dough.

Attention is again called to the feeding movement of the friction disk since thereby it is possible to start mixing the dough at either a slow or high speed by which it is worked well up the sides of the receptacle and then gradually as the speed changes the dough receives a rising and falling movement distinctly novel and resulting in a complete intermingling of the constituents.

It will now be apparent that I have devised a complete unitary structure, simple in construction, efficient in operation and one in which the dough mixing operation may be not only completed in half the time ordinarily consumed but in which the intermingling of the air, gases and dough is so uniformly produced as to result in a dough having qualities far superior to any dough heretofore produced in a mixing machine and which, as far as I am aware, can only be obtained by varying the speed of the mixing devices and causing them to rotate, during a portion of the operation of the mixer, in one direction and during the other portion of the mixing, move in a reverse direction. Furthermore, I have found in practice that a gradual changing of the speed of the mixing blade causes a complete and thorough working of the dough and that the varying speed at which the blade works tends to carry the dough upward in the receptacle, holding it suspended for a time at intervals and then as the speed gradually diminishes, allowing the dough to gradually fall to the bottom of the receptacle, where it is again picked up during the reverse movement of the blade and worked in a similar manner.

It will now be apparent that I have devised a novel and useful construction of a dough mixing machine which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, the combination of a single arm dough mixer, with means for driving said single arm, and means for uniformly varying the speed of said means from a maximum to a minimum and from a minimum to a maximum.

2. In a device of the character stated, the combination of a dough mixer having a revoluble arm or blade, a driving shaft, means to transmit motion therefrom to said arm or blade, a friction member mounted on said shaft, a friction disk suitably mounted adjacent said friction member and adapted to contact therewith, and means to vary the position of said friction member relative to said friction disk whereby the direction of rotation of said arm or blades is reversed and its speed varied uniformly.

3. In a device of the character stated, a frame, a dough receptacle carried thereby, a blade rotatably mounted in said receptacle, a driving shaft rotatably mounted in said frame, driving connections between said shaft and blade, a friction member slidingly mounted on said drive shaft, a friction disk adapted to coöperate with said friction member, means to feed said friction member from one edge of said friction disk to the opposite edge and means to drive said friction disk.

4. In a device of the character stated, a frame, a dough receptacle mounted thereon and adapted to be tilted, a mixing blade rotatably mounted in said receptacle, a drive shaft, a suitable connection between said shaft and blade, a main shaft mounted at right angles to said drive shaft, a disk carried by said main shaft adapted to engage said friction wheel, a feed screw suitably mounted in said frame and a leader nut on said feed screw and connected to said friction wheel, whereby said wheel is shifted across the face of said friction disk from one edge thereof to the opposite edge.

5. The method of mixing dough which consists in revolving a mass of dough at a uniform speed for a certain period, increasing said speed to a maximum, gradually reducing the speed and bringing the dough to rest, then revolving the dough in a reverse direction increasing the speed and then decreasing the speed and bringing the dough to rest.

6. The method of mixing dough which consists in revolving a mass of dough at a predetermined uniform speed for a certain period, then increasing said speed to a predetermined or maximum speed, then gradually reducing the speed and bringing the dough to rest, then reversing the direction of revolving the dough and increasing the speed to a predetermined or maximum speed, again decreasing the speed and bringing the dough to rest and then increasing the speed to the uniform starting speed.

HUGO GOTTSCHALK.

Witnesses:
 ROBERT M. BARR,
 C. D. McVAY.